US008072094B2

(12) United States Patent
Liang et al.

(10) Patent No.: US 8,072,094 B2
(45) Date of Patent: Dec. 6, 2011

(54) ACTIVE OUTPUT COMPENSATION CIRCUIT

(75) Inventors: Shih An Liang, Taoyuan (TW); Hsu Chien Lung, Taoyuan (TW); Ching Wen Huang, Taoyuan (TW)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 471 days.

(21) Appl. No.: 12/346,315

(22) Filed: Dec. 30, 2008

(65) Prior Publication Data

US 2010/0164281 A1 Jul. 1, 2010

(51) Int. Cl.
*H02J 3/00* (2006.01)

(52) U.S. Cl. ................. 307/28; 307/58; 307/82; 307/87

(58) Field of Classification Search .................... 307/44, 307/58, 59, 82, 85–87, 64–66, 28
See application file for complete search history.

(56) References Cited

U.S. PATENT DOCUMENTS 5,386,147 A * 1/1995 Bonneau et al. ................ 307/64
6,211,579 B1 * 4/2001 Blair ............................... 307/28

* cited by examiner

*Primary Examiner* — Fritz M Fleming
(74) *Attorney, Agent, or Firm* — Winston Hsu; Scott Margo

(57) ABSTRACT

An active output compensation circuit is adopted for use on a power supply which receives input power and regulates to become a plurality of different output power. The power supply has a transformer to transform the input power. The transformer has a secondary side connecting to a plurality of output regulation units to deliver the output power. The active output compensation circuit includes a voltage difference judgment unit electrically connected to the output regulation units and a plurality of compensation channel switches. The compensation channel switches bridge two output regulation units and the voltage difference judgment unit. The voltage difference judgment unit judges the voltage difference of two output power and determines whether to output an ON signal. The compensation channel switches are driven by the ON signal and set ON so that one output power can compensate another output power.

2 Claims, 4 Drawing Sheets

ACTIVE OUTPUT COMPENSATION CIRCUIT

FIELD OF THE INVENTION

The present invention relates to an active load circuit that provides output compensation and particularly to a circuit adopted for use on the power supply to provide reciprocal compensation between a plurality of output electric power.

BACKGROUND OF THE INVENTION

Power supply providing multiple output power to drive a plurality of electronic devices is a technique known in the art. The multiple output power can have differential potentials to supply electronic devices of different powers. Refer to FIG. 1 for a conventional power supply structure. It is connected to a power source 1 to receive input power. It mainly includes a power factor correction unit 2 to regulate the power factor of the input power, a transformer 3 connecting to the power factor correction unit 2 to receive the input power and generate an inductive power on a secondary side, and a switch circuit 4 electrically connected to the transformer 3 that has a switch 42 and a pulse width modulation unit 41 to drive the switch 42 ON or OFF. Through ON or OFF of the switch 42, the period of current passing through the transformer 3 can be altered, and the power transmitted from the primary side of the transformer 3 to the secondary side can be controlled. The inductive power of the secondary side of the transformer 3 is regulated by a plurality of output regulation units 51, 52 and 53 to become a plurality of output power delivered to corresponding output ends 61, 62 and 63. The output regulation units 51, 52 and 53 can deliver the output power at different potentials. The output regulation units 51, 52 and 53 are independent loops and cannot provide reciprocal compensation of the output power between them. Hence the conventional power supply provides power to an individual grounded load with an individual voltage. There is no energy compensation between two sets of voltages.

SUMMARY OF THE INVENTION

The primary object of the present invention is to improve the disadvantage of the conventional power supply mentioned above by providing a circuit to provide power compensation between a plurality of output power of a power supply and determine the compensation timing through detecting loaded conditions of the output power.

The invention aims to provide an active output compensation circuit for a power supply which is connected to a power source to receive input power and regulate to become a plurality of different output power. The power supply includes a transformer to receive the input power and generate an inductive power, a switch circuit to regulate the period of inductive power generation of the transformer and a plurality of output regulation units electrically connected to the transformer to regulate the inductive power to output power. The active output compensation circuit bridges the output regulation units to provide electric paths to perform power compensation between the output powers. The active output compensation circuit includes a voltage difference judgment unit electrically connected to the output regulation units and a plurality of compensation channel switches. The compensation channel switches are electrically connected to two output regulation units and the voltage difference judgment unit. The voltage difference judgment unit has at least one comparison circuit which outputs an ON signal depending on the voltage difference of the output power of two output regulation units. The compensation channel switches receive the output power from the two output regulation units. The compensation channel switches receive the output power of the two output regulation units and are driven by the ON signal to be set ON to allow one output power to compensate another output power. The invention judges the loaded condition of output power by detecting the voltage difference between them, and through the ON signal generated by the voltage difference judgment unit drives the compensation channel switches to do compensation between the output powers. The ON condition of the compensation channel switches is determined by the potential of the ON signal. Hence the compensation channel switches can be seen as an active load changeable according to the loaded condition. And a regulation mechanism for compensation is established and determined according to the loaded condition.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
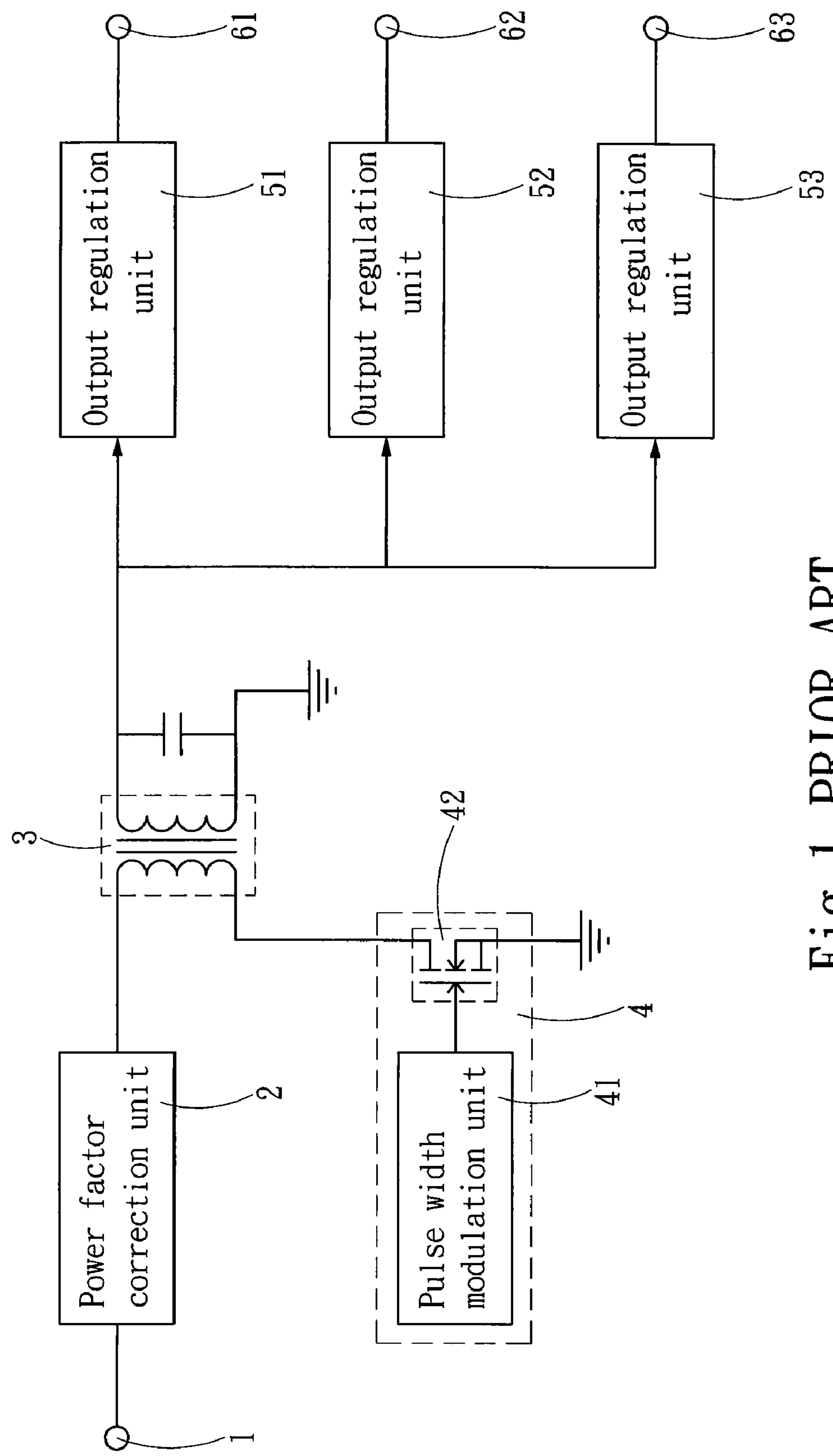
FIG. 1 is a structural block diagram of a conventional power supply.
Figure 2:
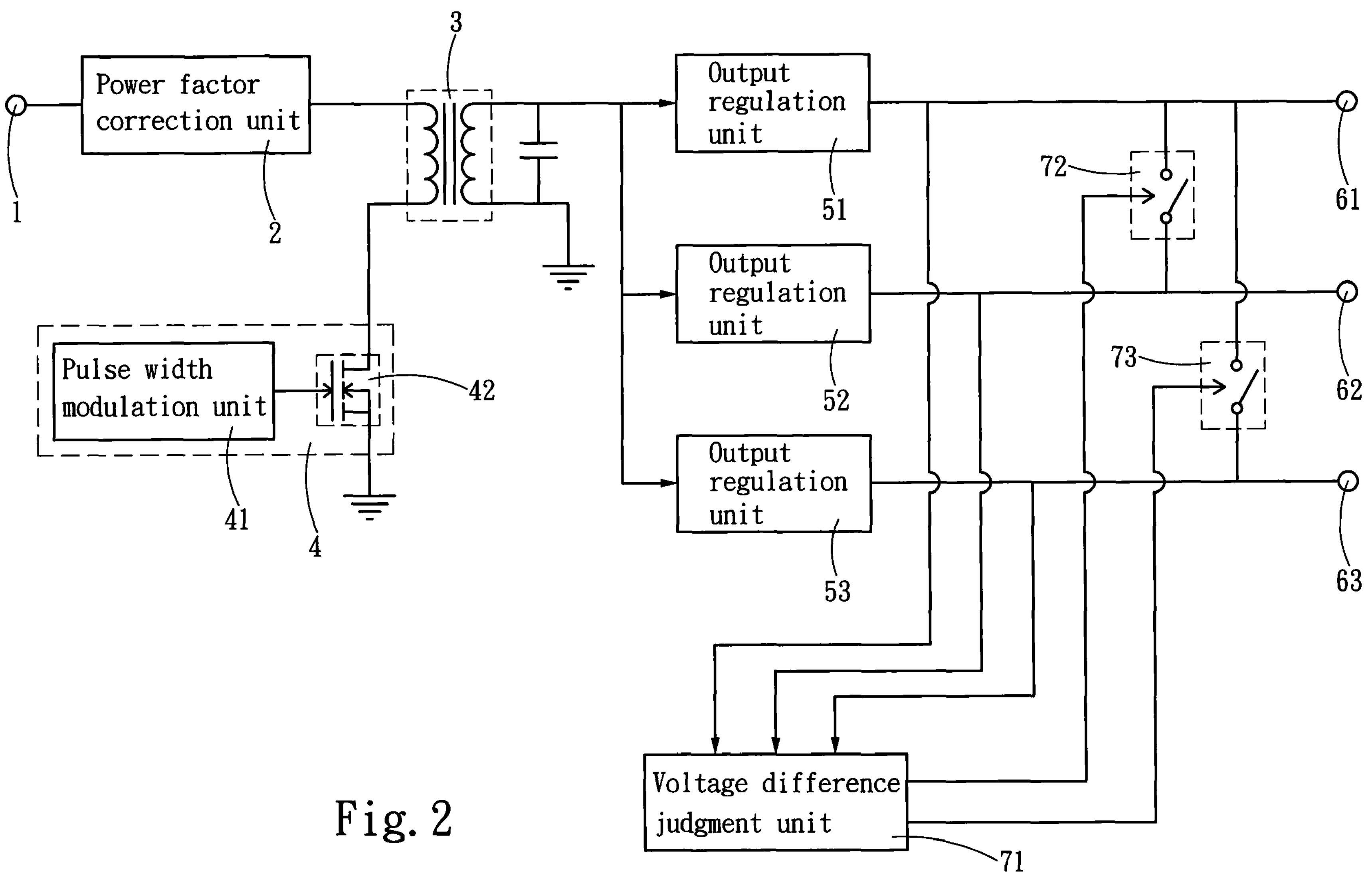
FIG. 2 is a circuit block diagram of the invention.
Figure 3:
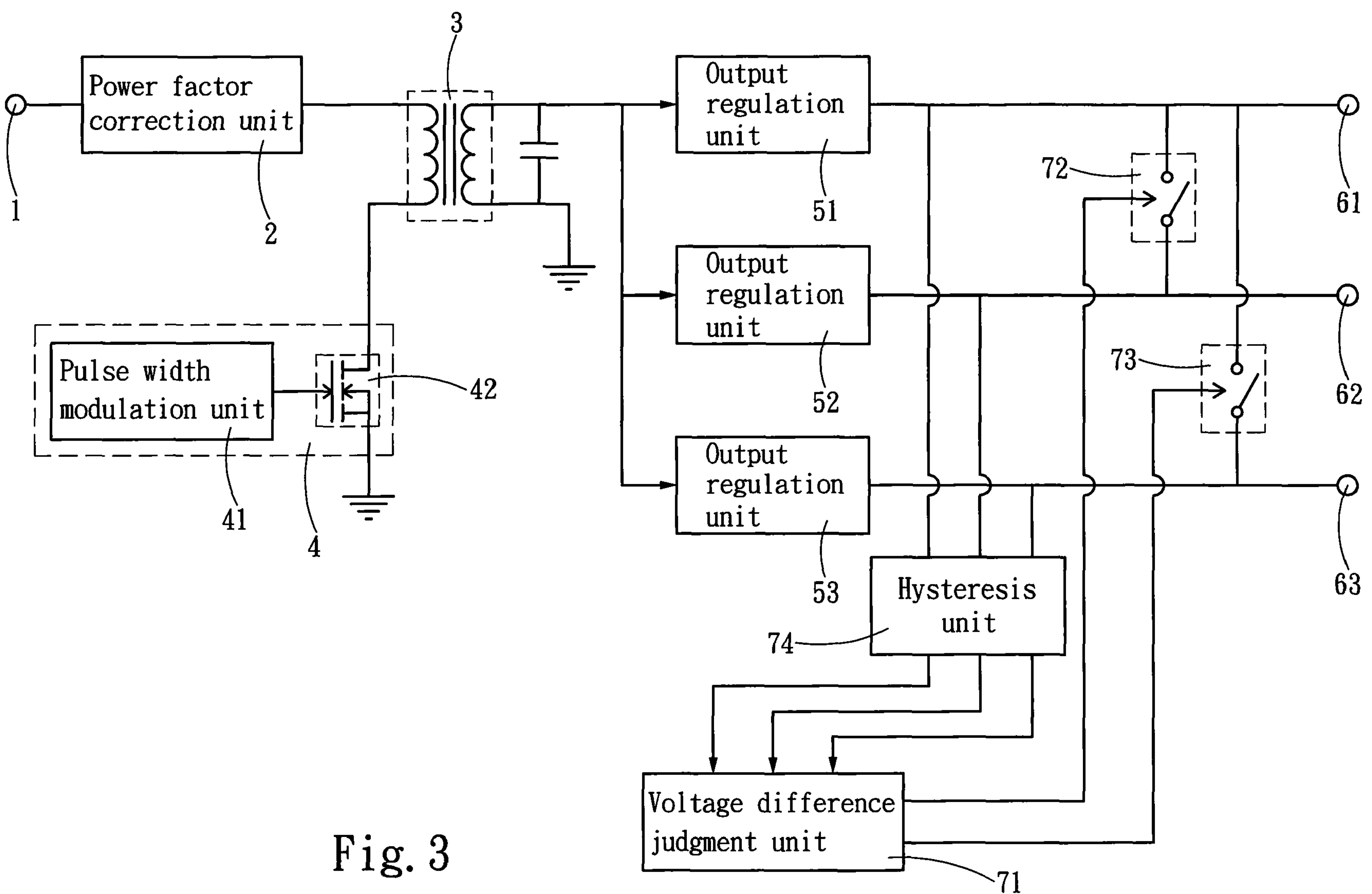
FIG. 3 is a structural block diagram of another embodiment of the invention.

Please refer to FIG. 2, the present invention provides an active output compensation circuit. It is adopted for use on a power supply which is connected to a power source 1 to receive input power and regulate to become a plurality of different output power. The power supply includes a power factor correction unit 2 to regulate the power factor of the input power, a transformer 3 connecting to the power factor correction unit 2 to receive the input power and generate an inductive power, a switch circuit 4 to control current direction of the transformer 3 and regulate the period of inductive power generation of the transformer 3, and a plurality of output regulation units 51, 52 and 53 that are electrically connected to the transformer 3 to regulate the inductive power to output power. The switch circuit 4 includes a pulse width modulation unit 41 and at least one switch 42. The pulse width modulation unit 41 drives the switch 42 to regulate the electric power passing through the transformer 3. The output regulation units 51, 52 and 53 can generate the output power at different potentials. The output regulation units 51, 52 and 53 are electrically and respectively connected to an output end 61, 62 and 63 to deliver the output power to external loads. When the output ends 61, 62 and 63 are connected to the loads (called loaded in short), the potentials of the output power change due to the loaded condition. The active output compensation circuit bridges the output regulation units 51, 52 and 53 to provide an electric path for power compensation between the output powers. The active output compensation circuit includes a voltage difference judgment unit 71 electrically connected to the output regulation units 51, 52 and 53, and a plurality of compensation channel switches 72 and 73 electrically connected to the voltage difference judgment unit 71. The compensation channel switches 72 and 73 also electrically bridge two of the output regulation units 51, 52 and 53 (may be in various configurations, such as between 51 and 52, 51 and 53, or between 51, 52 and 53). Each of the compensation channel switches 72 and 73 has two ends electrically connected between the output regulation units 51 and 52, and 51 and 53 to output power. Thus the compensation channel switches 72 and 73 form a linked compensation channel between two input powers. The voltage difference judgment unit 71 receives the output power between the output regulation units 51, 52 and 53 and the output ends 61, 62 and 63 to detect voltage variations between the output ends 61 and 62, and 61 and 63, then determines whether to generate an ON signal. The output regulation units 51, 52 and 53 output voltages at a rate level. When the output ends 61, 62 and 63 are loaded, the potentials change. The voltage difference judgment unit 71 has a preset voltage difference range between two output powers. In the event that the voltage difference between the two output ends 61 and 62, or 61 and 63 exceeds the voltage difference range preset by the voltage difference judgment unit 71, the ON signal is generated. The compensation switch 72 or 73 is driven by the ON signal and set ON. Therefore, one output power can compensate another output power. For instance, when the output end 62 is loaded, the potential of the output end 62 drops, and the voltage difference judgment unit 71 detects the increase of the voltage difference between the output ends 61 and 62, and sends the ON signal to the compensation channel switch 72 to set ON thereof. Then a compensation channel is established to allow the voltage at another output end 61 to compensate the output end 62. Hence the voltage at the output end 62 can be stabilized without dropping and out of control. Similarly, another compensation switch 73 between the output ends 61 and 63 and the voltage difference judgment unit 71 also can function likewise. By means of the circuit set forth above, the output power can be mutually compensated between them. Refer to FIG. 3 for another embodiment of the circuit structure. To prevent constant ON and OFF of the compensation channel switches 72 and 73 caused by a small fluctuation of the output power, the voltage difference judgment unit 71 can be connected to a hysteresis unit 74. The hysteresis unit 74 provides a voltage buffer to regulate the sensitivity of the voltage difference judgment unit 71 to prevent it from generating the ON signal triggered by a small voltage fluctuation.

Figure 4:
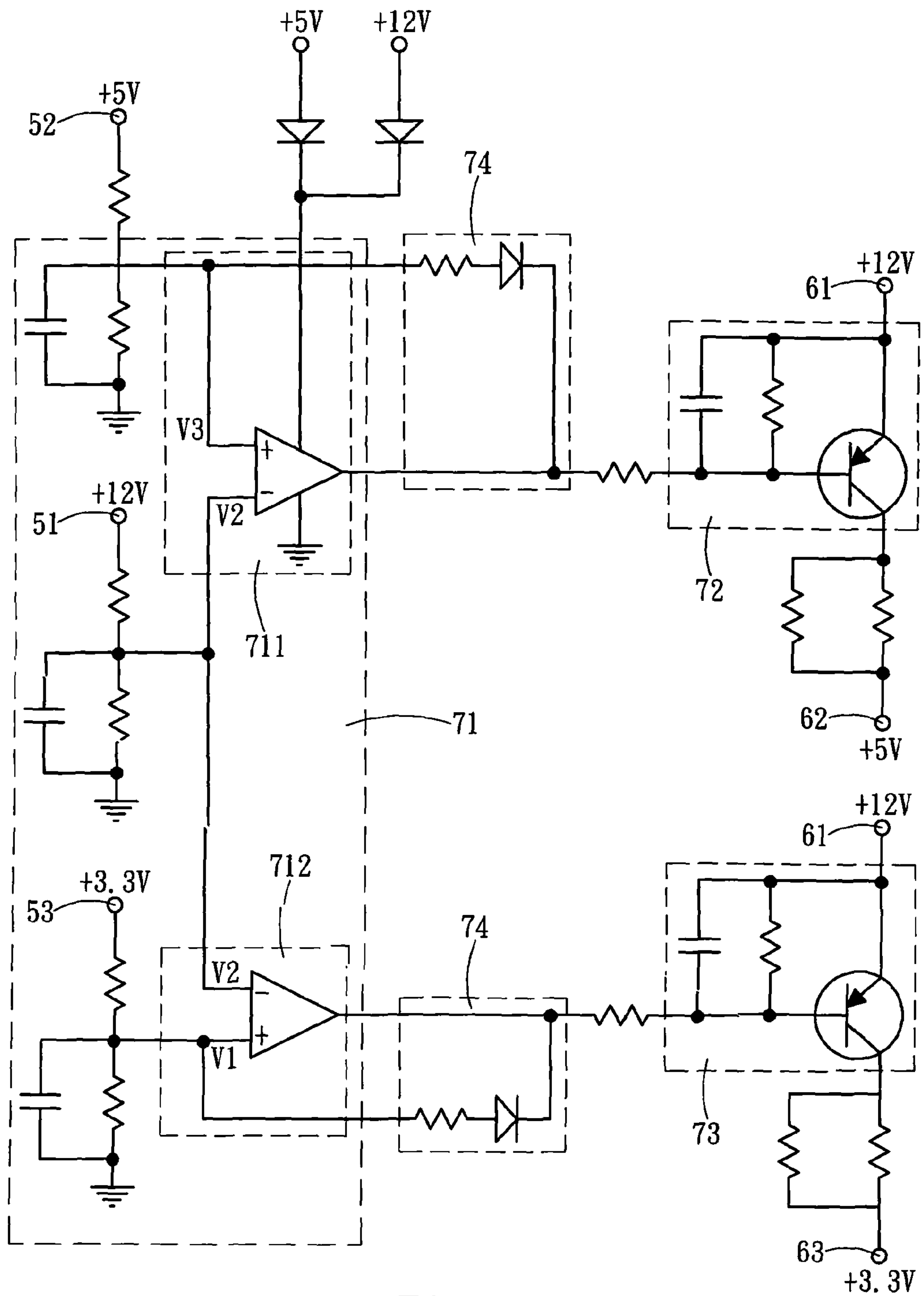
FIG. 4 is a circuit diagram according to FIG. 3.

Refer to FIG. 4 for an embodiment according to the aforesaid circuit structure. The multiple output regulation units 51, 52 and 53 provide output power at different potentials. The voltage difference judgment unit 71 has at least one comparison circuit 711 and 712 each has a positive input end and a negative input end connecting to different output power. The comparison circuit 711 has the negative input end connected to the output regulation unit 51 to receive the input power of a higher potential and the positive input end connected to another output regulation unit 52 to receive another input power thereof. The comparison circuit 711 further has one output end to deliver the ON signal. The comparison circuit 711 detects the voltage difference of the two input ends and outputs or stops generating the drive signal to control ON/OFF of the compensation channel switch 72; therefore, controls whether to allow the output power delivered from the output end 61 to pass through the compensation channel switch 72. Likewise, the comparison circuit 712 receives the output power from the output regulation units 51 and 53 and performs comparison, then generates the driving signal to control ON of the compensation channel switch 73. To avoid the compensation channel switches 72 and 73 from being constantly set ON and OFF due to a small fluctuation of the output power, the positive input end and output end of the comparison circuits 711 and 712 are respectively bridged in parallel by a hysteresis unit 74 to provide a voltage buffer to regulate the sensitivity of the comparison circuits 711 and 712.

By means of the structure previously discussed, the loaded condition of multiple output power can be judged according to detecting the voltage differences between them. Through the ON signal generated by the voltage difference judgment unit 71, the compensation channel switches 72 and 73 can be driven to provide compensation between the output powers. The ON condition of the compensation channel switches 72 and 73 is determined by the potential of the ON signal. Hence the compensation channel switches 72 and 73 can be seen as an active load according to variations of the loaded condition to provide a regulation mechanism to perform compensation as desired.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An active output compensation circuit for a power supply which is connected to a power source to receive input power and regulate to become a plurality of different output power and also includes a transformer to receive the input power and generate inductive power, a switch circuit to regulate the period of the inductive power and a plurality of output regulation units electrically connected to the transformer to regulate the inductive power to the output power, comprising:

a voltage difference judgment unit which is electrically connected to the output regulation units and has at least one comparison circuit to compare voltage difference of the output power of two output regulation units to determine whether to output an ON signal; and a compensation channel switch electrically bridging the two output regulation units and the voltage difference judgment unit, wherein the compensation channel switch electrically connects to the output power of two output regulation units, and the compensation channel switch is driven by the ON signal and set ON to allow one output power to compensate another output power; where the output power have different potentials, and the comparison circuit has a positive input end and a negative input end to receive different output power and an output end to output the ON signal; wherein the positive input end of the comparison circuit and the output end are bridged in parallel by a hysteresis unit.

2. The active output compensation circuit of claim 1, wherein the output power generated by output regulation units have different potentials.

* * * * *